CONTINUOUS DATA RECORDING APPARATUS

Filed Aug. 9, 1966 Sheet 1 of 2

INVENTOR
DENNIS C. STANGA
BY Charles P. Johnson
ATTORNEY

CONTINUOUS DATA RECORDING APPARATUS

Filed Aug. 9, 1966 Sheet 2 of 2

United States Patent Office 3,439,344
Patented Apr. 15, 1969

3,439,344
CONTINUOUS DATA RECORDING APPARATUS

Dennis C. Stanga, Hennepin, Minn., assignor to Sperry Rand Corporation, New York, N.Y., a corporation of Delaware

Filed Aug. 9, 1966, Ser. No. 571,309
Int. Cl. G11b *13/00, 5/00;* G06f *11/00*
U.S. Cl. 340—172.5 9 Claims

ABSTRACT OF THE DISCLOSURE

Apparatus for effecting continuous recording on a continuously running recording medium to provide matching of data transfer rates from magnetic tape, or the like, with that of a utilization device such as a Computer during conflict periods or priority interrupt intervals. A recording format of parallel recording channels or tracks, e.g., a parity track, a control track and a plurality of data tracks, is utilized. Whenever a priority interrupt occurs during a recording operation logic circuitry generates and records, in place of the data that would have been recorded except for the priority interrupt, a parity bit in the parity track, an ignore bit in the control track and a No-data code, or quene fill, in the data track. After termination of the priority interrupt, recording of the data continues in normal fashion. Upon readout, logic circuitry interprets the ignore bit inhibiting transfer of the associated bits in the data tracks, i.e., the No-data code.

Figure 1:
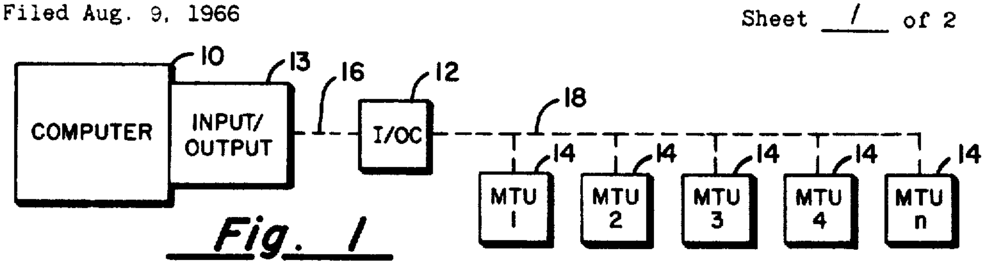

In high performance systems, it is often required that great quantities of data be handled by a Computer and recorded virtually continuously. An example of such operation is the bulk processing of telemetry data. In orded to handle these large data quantities, it has been found desirable to run the recording medium continuously, thereby avoiding start-stop delays. Such a system has a problem where the Computer must be interrupted to execute an alternate function and is caused to forego the continuous transfer of data to the recording medium. Such interruption can be referred to as a "priority interrupt," or a "priority conflict." This simultaneous demand for Computer attention can be referred to as "queuing."

A requirement of prior magnetic tape devices is that all data comprising a given data segment be written in successive frames. Where the magnetic tape unit is coupled to a Computer, the occurrence of a priority conflict affects the computer's ability to supply data. A higher priority instruction may preclude data from being available for a write cycle which prevents the above requirement from being fulfilled. As a result, a No-data pattern was initiated and recorded on the magnetic tape whenever data was not available. When read back, the No-data pattern caused all data preceding the No-data pattern to be treated as useless, and it was necessary in prior devices to rewrite the entire data segment in successive frames following the No-data pattern. When the data on the tape was subsequently transferred to another device, the useless along with the useful data was transferred and stored. This maner of operation resulted in an inefficient utilization of storage area of the other device, and a loss of time in transferring the useless data frames.

In order to obviate the deficiencies of prior art devices, the present invention uses various logic circuitry for achieving a continuous data recording format on a record medium such as magnetic tape. The subject invention incorporates a control track and logic associated with the control track, along with a parity track on the record medium. Logic circuits control the coding and decoding of the parity, control tracks and the information recorded on the data tracks of the tape. Whenever a priority interrupt occurs, and therefore normal transmission of data is interrupted, the logic circuitry effects recording of a binary ignore code in the control track, and a predetermined No-data code, called a queue fill, in the data tracks. During a subsequent transfer of the data to the Computer or other utilization device, only the frames not having the ignore code in the control track are transferred. The ignore code for this embodiment is a binary "1" in the control track. In the absence of the binary "1" in the control track, in other words a binary "0," the frame is to be treated as good data.

Accordingly, it is an object of the present invention to provide apparatus for providing an improved recording format on a record medium.

It is another object of the present invention to provide an improved apparatus for providing a recording format on a record medium utilizing a control track, in which is recorded a binary ignore code during priority conflict, for causing the data frame associated therewith to be ignored during a subsequent read operation.

It is another object of the present invention to provide an improved apparatus for providing a recording format on a record medium utilizing a control track in which is recorded a binary "1" for each frame data is not to be recorded and for recording a binary "0" for each frame in which data is to be recorded.

Yet another object of the present invention is to provide apparatus for effecting a continuous data recording format on a record medium to increase the useful storage area thereon.

Still another object of the present invention is to provide apparatus for effecting a continuous data recording format on a record medium to increase the useful storage area thereon by effecting the completion of a data segment subsequent to a priority interrupt rather than rewriting the entire data preceding the priority interrupt.

Another object of the present invention is to provide apparatus for utilizing control and parity tracks adjacent the data tracks on a record medium, the circuitry causing the control track to contain a binary "1" whenever a priority conflict occurs indicating data is unavailable, and causing a queue fill code to be recorded in the data tracks.

A still further object of the present invention is to provide apparatus for effecting a recording format on a record medium containing a plurality of data tracks, a parity track, and a control track, wherein the data tracks contain a queue fill pattern e.g., comprising binary "1's" written in alternate tracks, and the control track contains a binary "1's," said binary "1's" being written whenever a priority conflict occurs indicating lack of data to record, said "1" signal, ensuring non-transferral of such information to a utilization device coupled thereto.

Figure 2:
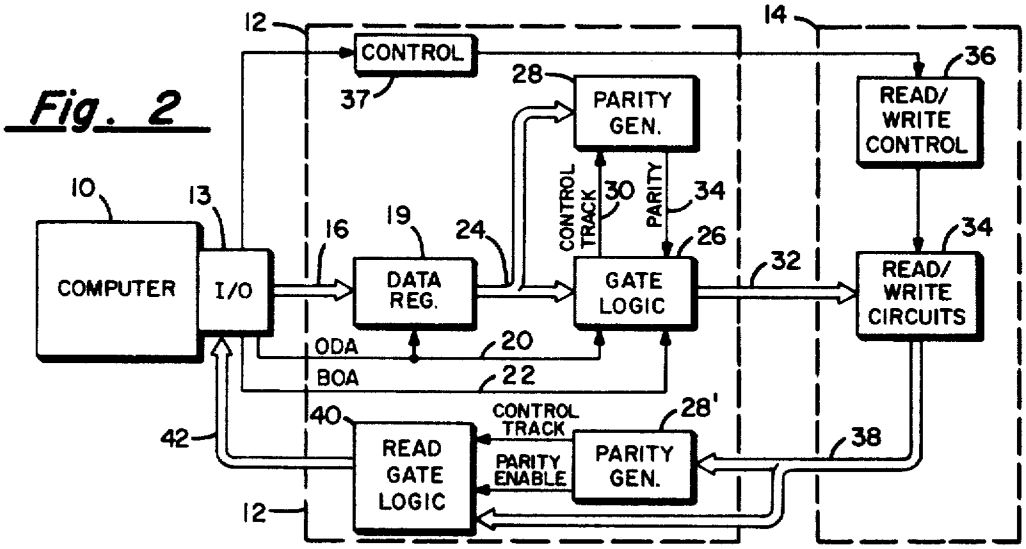
Figure 3:
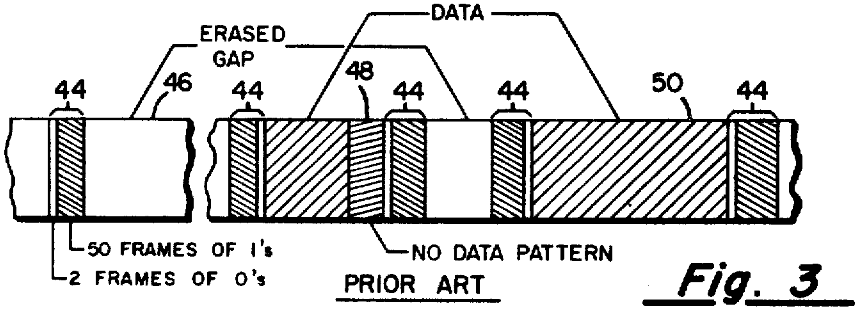
Figure 4:
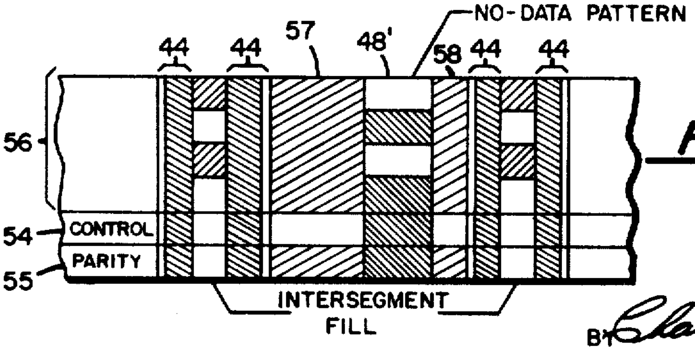
Figure 5:
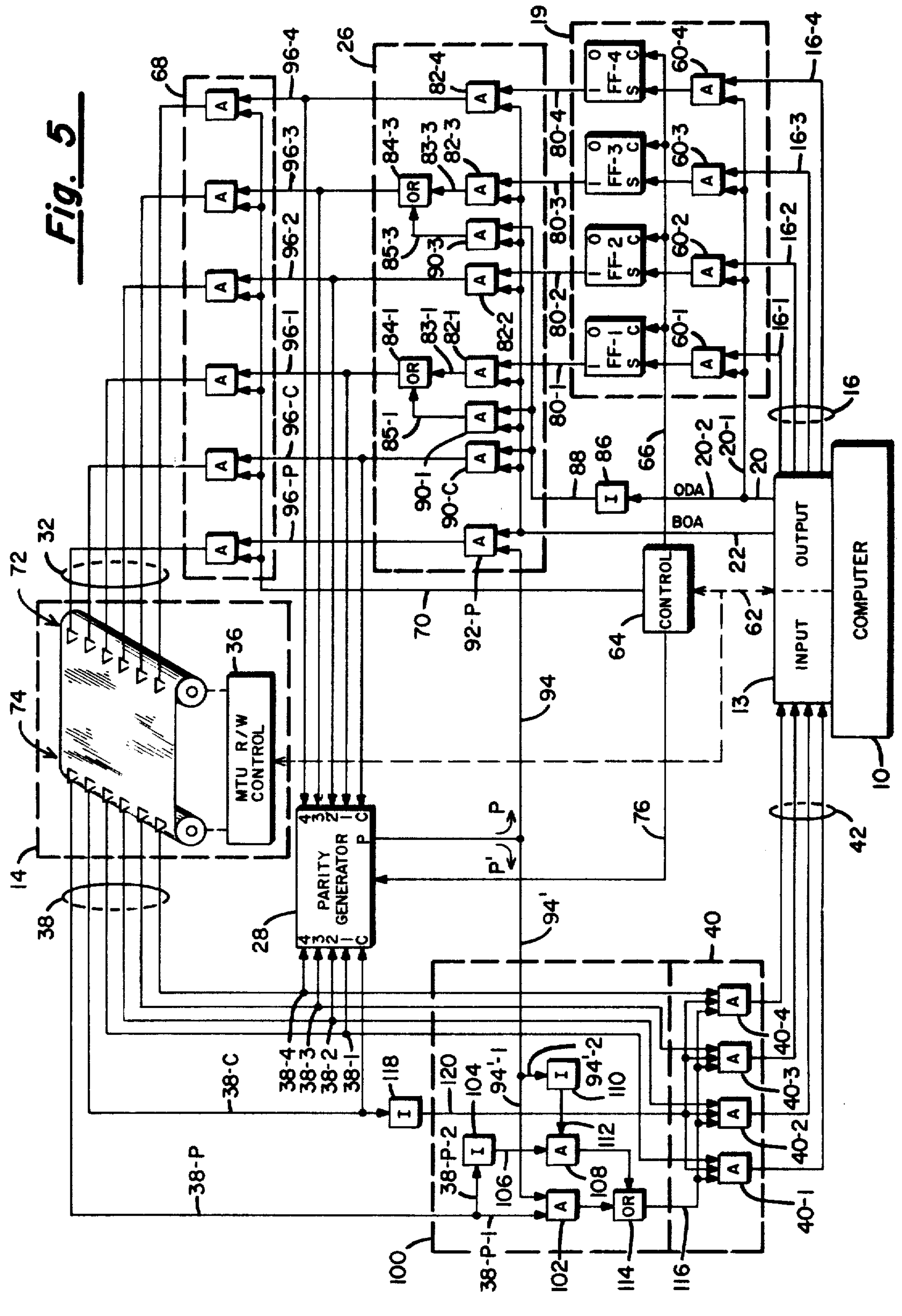

These and other more detailed objects will be apparent from the specification and drawings in which: FIGURE 1 is a schematic illustration of a data processing system incorporating the present invention; FIGURE 2 is a functional schematic illustration of the data processing system of FIGURE 1 showing the present invention in greater detail; FIGURE 3 illustrates a recording format of the prior art. FIGURE 4 illustrates the continuous recording format of the present invention; and FIGURE 5 is a detailed circuit diagram incorporated in the system featuring logic for recording and reading continuous data format on magnetic tape.

Referring to FIGURE 1, there is shown a schematic illustration of a data processing system including magnetic tape peripheral devices coupled to the input/output section of the Computer by a control unit. While other varieties of peripheral equipment may be additionally utilized, for purposes of simplicity only, magnetic tape units are shown for this embodiment. The Input/Output Control unit 12, hereinafter referred to as I/O C 12, interfaces the I/O Section 13 of the Computer 10 to one or more peripheral devices 14, which as shown are Magnetic Tape Units, hereinafter termed MTU. The Computer 10 can be a general purpose digital computer chosen from among many such computers readily available commercially. The function of the I/O Section 13 of the Computer is to transfer data and instruction words both to and from the Computer and for the execution of I/O instructions. Where there is an external function to be executed, the I/O Section 13 selects an external equipment for operation and, in many cases, selects the mode of operation for that equipment, such as start, stop, search, rewind, and the like. For example, external read achieves storage of data, which data has been transmitted from previously selected external equipment, in a computer high speed storage, and external write extracts data from the computer high speed storage for transmission to previously selected external equipment.

The control of external equipment provided by the execution of appropriate external function instructions, is merely a basic initial control, which provides signal combinations for activating the control circuitry internal to I/O C 12. External function instructions are used to start and define how an equipment is to operate, but other circuitry associated with the equipment itself then takes over, interprets what is to be done, and actually controls the equipment while the required operation is carried out. As soon as the external function instruction is executed, the Computer is free for other computing operations. At specific times in the initiated operation of the external equipment, the program must process data, that is the computer must execute external read or external write instructions, as required by the input/output operation in progress.

Magnetic tape data processing, therefore, can be seen to be under computer program control, in accordance with appropriately programmed external function, external read, and external write instructions.

The magnetic tape units are both an auxiliary memory for the Computer and an input/output equipment. As an auxiliary storage system, they provide a flexible memory of virtually unlimited capacity for the Computer. As input/output devices, they give the Computer fast in-out data handling properties.

Referring to FIGURE 1, data transmission channels between the Computer I/O Section 13 and between I/O C 12 and the MTU's 14 are referenced as 16 and 18 respectively. While it is possible to couple a plurality of MTU's 14 directly to the I/O Section 13 of the Computer, generally, this is not the most expedient coupling arrangement. The Computer I/O Section 13 has a limited number of I/O channels which are utilized for different purposes. In those applications where a plurality of MTU's are coupled to the Computer, it is more desirable to provide intermediate apparatus such as the I/O C 12, which utilizes only one I/O channel from the Computer, so that the remaining channels are free to perform other desired functions. I/O C 12, in turn, is provided with a number of I/O channels to accommodate a large number of MTU's or other peripheral apparatus, as deemed necessary.

FIGURE 2 is a logic block diagram representing a more detailed functional illustration of the data processing system of FIGURE 1. Dashed enclosures 12 and 14 represent the basic system components shown in FIGURE 1. The system is, however, illustrated in greater detail to characterize the incorporation of the present invention in the system framework. Data is transmitted along channel 16 to Data Register 19. Additionally, the Computer I/O Section 13 provides a signal on Output Data Available lead 20, referenced as lead ODA, to the Data Register 19. Another signal is provided on Buffer Output Active lead 22, designated lead BOA, to Gate Logic 26. An active signal appears on lead 20 whenever an output data word from the Computer 13 is available for transmission from the I/O Section 13. An active signal appears on lead 22 whenever output data buffer area is available for recording. From Data Register 19 data is transmitted via channel 24 to the Gate Logic 26 and to Parity Generating Logic 28. These data bits are transmitted in parallel. Parity Generating Logic 28 depends for one of its inputs on a signal (control track) gated to and appearing on lead 30 taken from channel 32 extending from Gate Logic 26. Parity Generating Logic 28 provides an output signal (parity) on lead 34 as an input to Gate Logic 26. Data is then transmitted via channel 32 to the Read/Write Heads 34 of a magnetic tape unit 14 whose read-write circuitry is under the control of a Read/Write Control unit 36 intercoupled to the Heads 34. Control 37 operates in response to External Function commands to activate the Read/Write Control Unit 36. From the Read/Write Heads, data is read and transmitted via channels 38 to Parity Logic 28′ and Read Gate Logic 40 in the I/O C 12. It is, of course, evident that Parity Generating Logic 28 can also be utilized during reading for the function performed by Parity Logic 28′, by simply providing the appropriate gating signals. The output data from Read Gate Logic 40 is transmitted via channel 42 back to the I/O Section 13 of the Computer 10 for utilization thereby. It is the interaction of the Control Track Signal and the Parity Signal generated which determines if the data frame will be allowed to pass through Read Gate Logic 40. This will be described in more detail below.

Referring to FIGURE 3 there is shown a record medium of the magnetic coated tape variety containing a prior art recording format in which data segments are separated by an end-pattern and a start pattern 44. The end pattern and the start-pattern may be alike, as is well-known in the art. A data segment may be defined as the data between a start-pattern and an end-pattern. The end-patterns illustrated may, for explanatory purposes herein, contain fifty frames of "1's" and two frames of "0's". A frame, on the other hand, is represented by one bit in each track across the tape width with a data frame mat including the parity and control bits. End-patterns and start-patterns between successive data segments are separated by block gaps 46, also termed erased gaps, which may be in the order of .75 inch. A data record length may be defined as the space between two block gaps. Data segment lengths are variable; hence, data record lengths are likewise variable. Such terms, unless stated otherwise, are equally applicable to the recording format of FIGURE 4.

In prior art systems it was a requirement that all data frames making up a data segment be written in successive frames. When system loading became such that the Computer could not handle all of the demands placed upon it and still maintain a ready supply of data words to be written on the magnetic tape, there arose what is referred to as a priority conflict. This merely means that some function, which is of a higher, importance than providing data words to be written, is being handled by the Computer, hence the requirement for recording data segments in continuous frames could not be met. Under such conditions the prior art devices caused a No-data code 48 to be written on the magnetic tape. The No-data pattern caused all data preceding this pattern in the data segment to be treated as useless. Accordingly, it was necessary to rewrite the entire data segment following the No-data pattern after termination of the priority conflict. With reference to the prior art recording format shown in FIGURE 3, upon the occurrence of a priority interrupt, a No-data pattern 48 was generated as shown. In the prior art, a subsequent reading of the tape by the reading logic detected the No-data pattern, and caused all data preceding the No-data pattern within the data segment to be treated as useless data. It was necessary, therefore, to rewrite the entire data segment in successive frames 50 following the No-data pattern in order that no data be lost. Subsequently, when the information stored on the tape is to be transmitted to a utilization device, which may be a Computer for example, the transfer of both useful and useless data resulted. Obviously, such transfer of data represents an inefficient use of such utilization device and a waste of Computer time, as well as a waste of what would otherwise be useful storage space on the magnetic tape.

A parity system is well-known in the art and is a self-checking coding system employing binary digits in which the total number of "1's" (or alternatively "0's") in each permissible code is always maintained odd or even. An additional digit position, called the parity bit, is utilized to record the digit which will result in the total count of "1's," including the parity bit, being odd or even. For this embodiment an even parity system is used. Parity checking on read-back can be accomplished by (1) counting the "1's" read, including the parity bit, and checking for an odd or even count, or (2) generating a new parity digit bit on the bits read back, exclusive of the parity bits, and comparing the newly generated parity bit with the previously recorded parity bit. When the check indicates the bits are alike, there was no error; and when they are different, it indicates an error has been made. The latter system is utilized in the embodiment of this invention.

To overcome the obvious disadvantages accruing from the inefficient prior art use of the magnetic tape, the present invention contemplates the use of a novel and efficient continuous data recording format. Referring to FIGURE 4, which illustrates the continuous recording format of the subject invention, the present invention contemplates the incorporation of a Control Track 54 and a Parity Track 55 disposed on the tape adjacent the Data Tracks 56. End patterns and start patterns 44 are like those shown in FIGURE 3. When the control logic detects the absence of data from the Computer, a "1" is written in the Control Track by the control track writing logic, thereby operating as an ignore code. At the same time, a predetermined No-data code 48', hereinafter referred to as "queue fill," is written in the Data Tracks 56. The pattern selected for this embodiment is a record of "1's" in alternate ones of the Data Tracks. For this embodiment four Data Tracks are utilized; hence, a quene fill pattern for the Data Tracks will look like 1010. Simultaneously, parity generation and checking logic, shown in FIGURE 5, performs a parity generation on the Data Tracks together with the Control Track. Refering to FIGURE 4 it can be seen that "1's" are represented by shading and "0's" are represented as clear areas. The number of "1's" in the Data Tracks and Control Track for a queue fill is odd. Therefore, the write transducers associated with the Parity Track will be activated to cause a "1" to be written in the Parity Track. As a result, there are "1's" recorded in half the data tracks to form the queue fill pattern and one each of the Control and Parity Tracks. Generation of the queue fill pattern and recording in the Control and Parity Tracks is accomplished by the logic circuitry which will be discussed and illustrated with reference to FIGURE 5. No. limitation, however, is intended as to the use of an even parity system, or to the precise queue fill pattern illustrated.

Whenever data is not available for writing, such as during priority interrupts, the aforementioned "1's" are written in the specified tracks. However, a resultant and distinguishing feature of the present invention as illustrated in FIGURE 4, over the prior art format illustrated in FIGURE 3, is that the previously recorded portion of the data segment need not be rewritten. After generation of the queue fill pattern 48', the writing of the data segment is completed, as illustrated, when it becomes available from the Computer. The data segment, and consequently the data blocks 57 and 58 that make up the data segment on the tape, may be interspersed with the queue fill patterns 48' resulting from priority interrupt occurrences with the remaining data block 58 of the data segment being written immediately after the queue fill 48' pattern.

In the particular illustration of FIGURE 4, data blocks 57 and 58 are separated by one frame of queue fill pattern 48', although in practice a plurality of continuous frames of queue fill pattern 48' will likely be present depending upon the duration of the priority interrupt occurrence. The control logic associated with the present invention specifically provides for the recording of binary "1's" in the Control and Parity Tracks during a priority interrupt. The end-patterns 44 will contain "1's" in both the Control and Parity Tracks. Upon a subsequent transfer of data from the magnetic tape to the Computer, only those data frames are transferred to the utilization device having a corresponding absence of "1's" in the Control Track. The start-pattern or end-pattern 44 is not transferred because of the presence of the "1" in the Control Track. Normally the purpose of the start-pattern is to provide the Computer with information that a new segment of data is to be distinguished from the preceding data. Then the actual data frames are transferred up to the area of the queue fill pattern. Again, the presence of a "1" in the Control Track prevents the logic of FIGURE 5 from transferring the queue fill pattern to the Computer. After passing the queue fill pattern, data transfer to the Computer re-commences until a succeeding end-pattern presents itself, and so on until the data has all been transferred.

A queue fill pattern is incorporated for a particular purpose. The reason for writing "1's" in one half of the Data Track is to minimize transducer turn-on noise by maintaining half of them in the active state, and to provide a bit pattern that will fail the parity check on read-back in the event the Control Track digit is either recorded improperly as a "0" or is read back improperly as a "0." Under the continuous recording format for the present invention, if for some reason a "1" is not written in the Control Track or is read back as "0," the Parity Checking Logic will find the parity of the frame to be odd, thereby indicating that a parity error exists when checked against the parity bit read from tape. The existence of a parity error causes associated logic of FIGURE 5 to inhibit data transfer as will be explained later.

To explain further, assume that an entire data segment has been written, and the read operation detects the aforementioned parity error. A program used with the system may allow options. One is to read back by moving the tape in reverse direction. Normally an error or errors are corrected or recoverable thereby. For example, dust particles, etc. may have caused the error and by reversing the tape, the dust is removed. The other option is to back-track the tape an entire data block length and re-read. Again the data is normally always recoverable. However, there are situations when the read operation detects a parity error which is of the non-recoverable type. The non-recoverable error may be due to oxide flake-off, and the like from the tape. Consequently, the error continues to persist. As a result, the bad spot provides garbled information. However, the fact that the non-recoverable type error exists in one data block segment does not mean that the entire data segment is to be treated as useless. Depending upon the particular application for which the program is written, the error may be insignificant. Bad-spot detection is always active when reading continuous data input tapes. A tape with limited imperfections can be used for a continuous data input in certain applications where many observations are recorded, and erroneous data can be "smoothed out" by the computer program. If it is essential, however, that perfect data be recorded under continuous data input recording, only perfect tapes may be used as is the case in current state of the art applications. From the standpoint of the present invention, the use of the queue fill pattern is extremely beneficial to accommodate the possibility of dropping the "1" bit in the control track. The apparent overall advantages of the continuous recording format are fully realized since there is an assurance that all data written is useful data and all data subsequently transferred to the Computer is useful data. In this manner, the most efficient use of the utilization device and the most efficient use of the storage area of magnetic tape is achieved. The data in the frames immediately preceding and following the queue fill pattern are transferred successively, thereby eliminating the requirement in prior art devices of rewriting data.

As stated above, one feature of the present invention is the increase in useful data that may be stored on a given magnetic tape. Prior art recording apparatus inserted a relatively large block gap 46 as indicated in FIGURE 3, for example .75 inch. Considering the amount of tape on a reel, the block gaps represent a significant amount of wasted tape which might otherwise contain useful storage data. In the present invention, on the other hand, the block gap is very small, in the area of .15 inch or smaller, which spacing corresponds to the spacing of the read/write transducers in the magnetic head. This type of magnetic head is best adapted for making the most efficient use of the tape storage area, where a plurality of pairs of read/write transducers are incorporated in one head structure. Upon writing data, the read transducer, which is spaced closely behind the write transducer, reads the data just written by the write transducers. The previous end-pattern is thereby checked before starting to write the next data record pattern, as the minimum block gap corresponds to the spacing between the read/write transducers.

Referring now to the detailed circuitry in FIGURE 5, there is shown a logic diagram of the present invention for providing the queue fill pattern shown in FIGURE 4, the bit in the control track, and the bit in the parity track, whenever data is not available for writing. In this logic diagram a logical "0" signal is considered to be a negative, or inactive signal; and a logical "1" signal is considered to be a positive, or active signal. The circuits designated A are positive AND circuits; the circuits designated OR are positive OR circuits; the circuits designated I are Inverter circuits; and the circuits designated FF are conventional bistable flip-flop circuits. Upon the occurrences of the No-data condition, that is when a priority interrupt occurs, the Computer I/O Section 13 causes a "0" level signal to appear on Output Data Available lead 20, hereinafter referred to as ODA lead 20. A "0" level signal impressed on lead 20 indicates that no output data is available for recording since a priority interrupt has occurred. Buffer Output Active lead 22, hereinafter referred to as BOA lead 22, from the Computer I/O Section carries a "1" level signal when the I/O Section indicates that data contained in the Computer is available for transmission. As distinct from the signal appearing on ODA lead 20, the former signal indicates only whether the data which is available for transmission is available for recording purposes. Even though a "1" level signal may appear on BOA lead 22, a priority interrupt would cause a "0" level signal to appear on ODA lead 20. This indicates that even though there is information available in the Computer, it is not available for use at that time. Connected to ODA lead 20 is a common input lead 20–1 to Data Register 19. The Data Register 19 is comprised of four bistable flip-flops designed FF–1, FF–2, FF–3, and FF–4. When set, each of these flip-flops provides a "1" signal from the 1 output terminal, and when cleared, provide a "0" signal at the 1 output terminal. The flip-flops are set by a "1" signal impressed on the S input terminal and are cleared by impressing a "1" signal on the C input terminal. Data frames to be recorded are transmitted from the Computer I/O Section 13 output portion via cable 16 to a set of gates 60 in the Data Register 19. The 1-digit is transmitted on wire 16–1 to AND circuit 60–1; the 2-digit is transmitted via wire 16–2 to AND circuit 60–2; the 3-digit is transmitted via wire 16–3 to AND circuit 60–3; and the 4-digit is transmitted via wire 16–4 to AND circuit 60–4. The output of each of these AND circuits is directed to a respectively associated S input terminal of the flip-flops. The signal provided on the ODA line 20 is directed via conductor 20–1 as another input to each of these AND circuits 60. It will be recalled that when data is present, a "1" signal is provided on the ODA line thereby enabling each of these AND circuits.

The Input/Output Section 13 provides control signals, represented by dashed line 62, which operate to control the operation of the MTU Read/Write Control 36 and to advise the Control Circuitry 64 of the nature of the operation to be preformed. For example, if a Write operation is to be executed, the MTU R/W Control 36 is so advised, and the drive mechanism (not shown) of the tape transport is activated to move the tape in the designated write direction and to activate the write circuitry. Similarly, if a Read operation is to be performed, signals are transmitted to the MTU R/W Control 36 for activating the read circuitry and for moving the tape in the designated read direction. These same signals advise the Control Circuitry 64 of the nature of the operation, thereby causing the generation of the appropriate control signals. The Control Circuitry 64, for a writing operation, operates to initialize the flip-flops of the Data Register 19 by applying a clear signal via conductor 66 to the C input terminal of each of the flip-flops at a time prior to the availability of data signals on cable 16. A set of Write Gates is illustrated within dashed block 68 and are utilized for providing synchronization of the parity bit, control bit, and the data bits for providing simultaneous writing for minimizing problems of skew. The Control Circuitry 64 operates at a time following the generation of the parity bit and the evaluation of the necessity of a queue fill pattern to provide an enable signal on conductor 70 to enable the Write Gates 68 for causing the parity bit, the control bit, and the data bits to be transmitted over cable 32 to the Write Circuits 72. The Control Circuitry 64 also operates to advise the Parity Generator 28 whether to accept signals from the Gate Logic 26 or from the Read Circuits 74 by virtue of the signal impressed on conductor 76. The precise nature of the Control Circuitry 64 is not shown in detail since it merely involves timing circuits well-known in the art and would not materially aid in the understanding of the subject invention. It is necessary only to understand the sequence in which the control pulses are impressed on conductor 66, 70 and 76.

The Gate Logic 26 is utilized for performing two separate functions. A first function is for gating a frame to the Write Gates 68 and for gating the frame less the parity bit to the Parity Generator 28. The second function is for generating the queue fill pattern when it is determined that the data frame is unavailable within the timing requirements of the continuous recording format. The flip-flops of the Data Register 19 are coupled to the Gate Logic 26. The 1 output terminal of FF–1 is coupled via wire 80–1 to AND circuit 82–1. The 1 output terminal of FF–2 is coupled via wire 80–2 to AND circuit 82–2. The 1 output terminal of FF–3 is coupled via wire 80–3 to AND circiut 82–3. The 1 output terminal of FF–4 is coupled via wire 80–4 to AND circuit 82–4. The output terminal of AND circuit 82–1 is coupled to OR circuit 84–1 via conductor 83–1. The output terminal of AND circuit 82–3 is coupled to OR circuit 84–3 via conductor 83–3. The signal received on the BOA line 22 is directed to each of the AND circuits in the Gate Logic 26. When the Buffer Output Active signal is present, the AND circuits in Gate Logic 26 are all enabled.

The ODA signal is provided on conductor 20–2 to I circuit 86. The inverted ODA signal is directed on conductor 88 to AND circuits 90–C, 90–1, 90–3. The output terminal of AND circuit 90–1 is coupled via wire 85–1 to OR circuit 84–1. and AND circuit 90–3 is coupled via wire 85–3 to OR circuit 84–3. When the ODA line is active, thereby indicating that data frames are available for recording, a "1" signal is impressed on conductor 20–2, which when inverted by I circuit 86, results in a "0" signal on conductor 88. A "0" signal on conductor 88 disables AND circuits 90–C, 90–1 and 90–3, thereby allowing AND circuits 82–1, 82–2, 82–3 and 82–4 to transmit the frame of data. In the alternative, when the ODA signal is "0," thereby indicating that a data frame is not available for writing, I circuit 86 will provide a "1" signal on conductor 88, thereby enabling AND circuits 90–C, 90–1, and 90–3. These AND circuits along with AND circuits 82–2 and 82–4 result in the generation of the queue fill pattern.

AND circuit 92–P receives an input signal from the BOA line and from the Parity Generator 28 via conductor 94. The output conductors from the Gate Logic 26 are designated 96–P, 96–C, 96–1, 96–2, 96–3 and 96–4. These output conductors are directed to respectively associated AND circuits in write gates 68. The output conductors 96–C, 96–1, 96–2, 96–3 and 96–4 are also directed to the Parity Generator 28 which operates to calculate the parity signal required based on the bit configuration received on the input lines, and to provide the resulting parity signal via wire 94 to AND circuit 92–P. The Parity Generator 28 is of a type well-known in the art and will not be described in detail. It may be of the so-called tree type, the shift-and-count type, or any other well-known parity generating circuit. As mentioned above, Control 64 operates via wire 76 to control the Parity Generator 28 for causing the parity signal to be directed via wire 94 to the Gate Logic, and to accept the input signals from the Gate Logic 26. When the parity signal has been generated, Control circuitry 64 provides the signal on wire 70 to the Write Gates 68 which gates the parity bit, the control bit, and the four data bits to the magnetic tape transport 14 via cable 32.

Having described the logic configuration utilized for generating the parity bit and writing data frames, and for generating the queue fill pattern in the absence of data to be recorded, it would appear to be advantageous to consider an example of each situation. Taking the situation first when a data frame is available, the Data Register 19 will initially be cleared, and "1" signals will be impressed on the ODA line and BOA line. The data signals will be transmitted via cable 16 and be set in the Data Register 19. The output signal from I circuit 86 will be a 0 thereby disabling the queue fill AND gates 90–C, 90–1 and 90–3. Since the ODA line has a "1" impressed thereon, all of the Gate Logic circuitry 26 will be enabled and the data bits will be passed through AND circuit 82–1, 82–2, 82–3 and 82–4 to Write Gates 68 and to the Parity Generator 28. The Parity Generator 28 will calculate the parity on the 4 data bits and provide the appropriate signal to be AND circuit 92–P. Since the output from I circuit 86 is 0, the output from AND circuit 90–C will be a 0 thereby providing a 0 for the Control Track. At the appropriate time, Control 64 will enable the Write Gates 68 thereby causing the frame, with its appropriate parity and control signals, to be written on the magnetic tape.

Turning now to a consideration of the situation when the frame is unavailable, a "0" signal will be provided on the ODA line. This will disable Gates 60 and result in a "1" signal being provided from I circuit 86 on conductor 88. The flip-flops again are cleared by Control 64 as an initial condition. The "1" signal on conductor 88 is directed to AND circuit 90–C which results in the generation of a "1" signal on conductor 96–C for the Control Track. The "1" signal directed to AND circuit 90–1 results in an output of "1" on conductor 85–1 through OR circuit 84–1 to conductor 96–1. Additionally, the signal on wire 88 is directed to AND circuit 90–3 thereby enabling a "1" to be propagated through OR circuit 84–3 to output conductor 96–3. Since the flip-flops of the data register 19 are initially cleared, AND circuit 82–2 and AND circuit 82–4 provide "0" output signals to conductors 96–2 and 96–4 respectively. It can be seen therefore, that the queue fill pattern has been generated by the absence of the signal on line ODA and has resulted in a pattern of a "1" signal on line 96–C, 96–1 and 96–3, with "0" signals on lines 96–2 and 96–4. These signals, when directed to Parity Generator 28 result in a combination count which requires a "1" bit to be written in the Parity Track to maintain even parity. Therefore, a "1" signal is impressed on AND circuit 92–P also, and results in a "1" signal being presented on wire 96–P to the Write Gates 68. At this time, the queue fill pattern has been completely generated and Control Circuitry 64 operates to enable Write Gates 68 thereby passing the queue fill pattern via cable 32 to the Write Circuitry 72.

Turning now to a consideration of the reading operation for the continuous recording format described above, it will be recognized that Computer 10 through its Input/Output Section 13 must advise the MTU R/W Control 36 that a Read operation is to be executed. These signals initialize Control 64 which enables Parity Generator 28 to receive input signals from conductors 38–C, 38–1, 38–2, 38–3 and 38–4. The resulting parity signal P′, which is generated from the Control Track and the four Data Tracks as read from the tape by Read Circuitry 74, is directed on wire 94′ to a Parity Checking Circuit shown enclosed in dashed block 100. The parity signal P read from the magnetic tape is carried via conductor 38–P to the Parity Checking Circuit 100. It is desired that a gating signal be derived from Parity Checking Circuit 100 when the parity signal P read from the tape equals the newly generated parity signal P′. Since a disable signal is desired when the parity signal P read from the magnetic tape does not equal the newly generated parity signal P′, the following logical relationship and truth-table describes the logical function of the circuitry that is enclosed in dashed block 100.

$$\text{Gate Signal} = PP' + \overline{PP'}$$

| Gate Signal | P | P′ |
|---|---|---|
| 1 | 0 | 0 |
| 1 | 1 | 1 |
| 0 | 0 | 1 |
| 0 | 1 | 0 |

The parity signal P is directed to AND circuit 102 via conductor 38–P–1 and to I circuit 104 via conductor 38–P–2. The output signal from I circuit 104 is carried on conductor 106 to AND circuit 108. These signal paths provide the P signal to AND circuit 102 and the $\overline{P}$ signal to AND circuit 108. The newly generated parity signal P′ received from Parity Generator 28 on conductor 94′ is directed to AND circuit 102 via conductor 94′–1 and to I circuit 110 via conductor 94′–2. The output signal from I circuit 110 is directed to AND circuit 108 via conductor 112. These signal paths result in the P′ signal being directed to AND circuit 102 and the $\overline{P}'$ signal being directed to AND circuit 108. The output signals from AND circuits 102 and 108 are directed to OR circuit 114 which provides a gating signal on conductor 116 to Read Gates 40. It can be seen therefore that when the parity signal P read from the magnetic tape equals the parity signal P′ generated by the Parity Generator 28, a "1" signal will be provided to each of Read Gate AND circuits 40–1, 40–2, 40–3 and 40–4. Alternatively, if the parity signal P read does not equal the parity signal P′ generated by Parity Generator 28, the enable line 116 will carry a "0" signal and Read Gates 40 are disabled, thereby preventing the erroneous data frame from being presented to the Input/Output Section of the Computer.

The data frame bits are provided to Read Gates 40 via conductors 38–1, 38–2, 38–3, and 38–4.

The Control Track signal is provided via conductor 38–C to I circuit 118. The output signal from I circuit 118 is carried on conductor 120 to each of the Read Gates 40 and operates as a control signal. When the Control Track carries a "1" signal thereby indicating a queue fill pattern, or some other editing pattern, a "0" signal will be derived on conductor 120 thereby disabling Read Gates 40, and preventing the worthless data frame from being presented via cable 42 to the Input/Output Section 13. In the alternative, when correct data is recorded on the magnetic tape and a "0" signal is recorded in the Control Track, the "0" signal provided to I circuit 118 will be inverted and the "1" signal on conductor 120 will enable each of the AND circuits in Read Gates 40. In summary then, it can be seen that the conditions must be met that the parity signals P and P′ are identical, and that the Control Track be "0" before Read Gates 40 will be enabled.

It is obvious that any one skilled in the art possesses knowledge enabling him to construct or purchase the commercially available components indicated in the accompanying logic diagrams and referred to in this specification as "parity generator," "flip-flop," "AND circuit," "OR circuit," and "inverter circuit." Those components which per se, are well-known in the art are not herein illustrated nor described in detail for the sake of simplifying the description of the invention.

It is to be understood that the logic circuit illustrated herein is illustrative, and that suitable modifications may be made in the structure as disclosed, within the spirit and scope of the subject invention. Having, now therefore, fully illustrated and described the subject invention, what is claimed to be new and desire to protect by Letters Patent is set forth in the appended claims.

What is claimed is:

1. A high performance data processing system comprising:

utilization means having output means for sending data signal groupings for recording and input means for receiving data signal groupings, said utilization means further including operation-control-signal-generating means for providing operation control signals indicative of reading and recording operations, said control-signal-generating means including output-data-available control means for alternatively providing first recording control signals indicative of the presence of said data signal groupings for recording and second recording control signals indicative of the absence of said data signal groupings for recording;

record-member handling means for transporting a record medium, said record-member handling means including a plurality of recording means for recording in channels and a like plurality of means for reading from said channels, said channels including a plurality of data signal channels, a parity signal channel, and a control signal channel, said record-member handling means responsively coupled to said operation-control-signal-generating means for continuously recording signal groupings in said channels in response to said recording operation control signals and for continuously reading said signal groupings recorded in said channels in response to said reading operation control signals;

recording-format control means coupled to said record-member handling means, said output means, said operation-control-signal-generating means and said output-data-available control means, for continuously causing recording of said signal groupings in response to said first recording control signals, and for alternatively causing recording of predetermined ignore-code signal groupings in response to said second recording control signals; and reading control means coupled to said record-member handling means, said input means, and said operation-control-signal-generating means for continuously reading said signal groupings, said reading control means including means for enabilng transfer of said data signal groupings to said utilization means and for inhibiting transfer of said ignore-code signal groupings to said utilization means.

2. A data processing system as in claim 1 wherein said recording-format control means includes receiving means coupled to said output means for receiving said data signal groupings to be recorded; recording-control-signal receiving means for alternatively receiving said first recording control signals indicative of the presence of said data signal groupings on said receiving means, and said second recording control signals indicative of the absence of said data signal groupings on said receiving means; gate means coupled to said receiving means and said recording-control-signal receiving means for causing said data signal groupings to be passed for recording in response to said first control signal; and ignore-code generating means coupled to said receiving means and said recording-control-signal receiving means for generating and causing to be passed for recording a predetermined ignore-code signal grouping indicative of the absence of said data signal groupings in response to said second control signal, whereby continuous recording is accomplished.

3. A data processing system as in claim 2 wherein said receiving means includes storage means for at least momentarily storing said data signal groupings.

4. A data processing system as in claim 3 and further including parity signal generating means coupled at least to said gate means for generating parity signals for said data signal groupings for recording in said parity signal channel.

5. A data processing system as in claim 4 wherein said ignore-code generating means includes means for generating a predetermined pattern of signal groupings indicative of an ignore condition for recording in said data signal channels, and further including means for generating an ignore-control signal, indicative of the absence of a data signal grouping, for recording in said control signal channel.

6. A data processing system as in claim 5 wherein said reading control means includes, parity-signal means for reading said parity signals; data-signal reading means for reading said data signal groupings; ignore-control-signal reading means for reading said control signals recorded in said control signal channel; read-back parity generating means coupled to said data-signal reading means and said ignore-control-signal reading means for generating a read-back parity signal; parity checking means coupled to said parity-signal reading means and said read-back parity signal generating means, and having a parity check output means for alternatively providing a first parity-check signal when the parity signal read equals the generated read-back parity signal and a second parity-check signal when the parity signal read does not equal the generated read-back parity signal; a plurality of read gates having input terminals coupled to said data-signal reading means, said ignore-control-signal reading means, and said parity check output means, and having output terminals coupled to said input means, said read gates operative for transferring data signal groupings read to said input means when said first parity-check signal is present and said ignore-control signal is absent, and being inoperative for transferring said data signal groupings to said input means when said ignore-control signal is read by said ignore-control-signal reading means or in response to said second parity-check signal.

7. A high performance recording system for continuously handling frames on a record medium having a plurality of parallelly disposed data channels, a parity channel and a control channel, including: receiving means for receiving data frames; data-available signal receiving means for alternatively receiving a first signal indicative that a frame of data is available on said receiving means and a second signal indicative that a frame of data is not available on said receiving means; gating means coupled to said receiving means and said data-available signal receiving means for passing said frame of data to be recorded in the data channels in response to said first signal, said gating means further including means for generating a first control signal indicative of the presence of a data frame to be recorded in the control channel; and means coupled to said data-available signal receiving means for generating a No-data code signal grouping to be recorded in the data channels, including means for generating a second control signal indicative of the absence of a data frame, said second control signal to be recorded in the control channel, and means operative upon reading said first or second control signal for enabling the transfer of a data frame upon the presence of said first control signal and for inhibiting the transfer of the No-data code signal grouping upon the presence of said second control signal since it does not represent useful data.

8. For use in a high performance data recording system utilizing a record medium having a plurality of data tracks, a parity track, and an ignore control track, continuous data handling apparatus comprising:

utilization means having output means for sending data signal groupings for recording and input means for receiving data signal groupings;

receiving means coupled to said output means for receiving data signal groupings to be recorded, said receiving means including storage means for at least momentarily storing said data signal grouping; control-signal receiving means for alternatively receiving first record-control signals indicative of the presence of said data signal grouping on said receiving means and second record-control signals indicative of the absence of said data signal grouping on said receiving means; gate means coupled to said receiving means and said control-signal receiving means for causing said data signal grouping to be passed for recording on the data tracks in response to said first record-control signal; and ignore-code generating means coupled to said receiving means and said control-signal receiving means for generating and causing to be passed for recording on said data tracks and said ignore control track a predetermined ignore-code signal grouping indicative of the absence of said data signal grouping in response to said second control signal; parity signal generating means coupled to said gate means and said ignore-code generating means for generating parity signals to be recorded on said parity track; said ignore-code generating means including No-data code generating means for generating a predetermined No-data code signal grouping indicative of an ignore condition for recording a No-data code signal grouping on the data tracks in place of the absent data signal grouping, and means for generating an ignore-control signal indicative of said absence of said data signal grouping for recording in said ignore control track.

9. Apparatus as in claim 8 and further including reading control means comprising: parity-signal reading means for reading said parity signals; data-signal reading means for reading said data signals groupings; ignore-control-signal reading means for reading said ignore-control signals recorded in said ignore control track; read-back parity generating means coupled to said data-signal reading means and said ignore-control signal reading means for generating a read-back parity signal; parity checking means coupled to said parity signal reading means and said read-back parity signal generating means and having a parity check output means for alternatively providing a first parity-check signal when the parity signal read equals the generated read-back parity signal and a second parity-check signal when the parity signal read does not equal the generated read-back parity signal; a plurality of read gates having input terminals coupled to said data-signal reading means, said ignore-control-signal reading means, and said parity check output means, and having output terminals coupled to said input means, said read gates operative for transferring data signal groupings read to said input means when said first parity-check signal is present and said ignore-control signal is absent, and being inoperative for transferring signals to said input means when said ignore-control signal is read by said ignore-control-signal reading means or in response to said second parity-check signal.

References Cited

UNITED STATES PATENTS

| | | | |
|---|---|---|---|
| 2,933,678 | 4/1960 | Westlake | 324—34 |
| 2,937,367 | 5/1960 | Bailey et al. | 340—174 |
| 3,159,819 | 12/1964 | Wright | 340—172.5 |
| 3,212,063 | 10/1965 | Olson | 340—172.5 |
| 3,214,736 | 10/1965 | Glaser | 340—172.5 |
| 3,245,046 | 4/1966 | Bernard et al. | 340—172.5 |
| 3,295,109 | 12/1966 | Paine et al. | 340—172.5 |
| 3,302,180 | 1/1967 | Donohoe et al. | 340—172.5 |

ROBERT C. BAILEY, *Primary Examiner.*

U.S. Cl. X.R.

340—174.1

U.S. DEPARTMENT OF COMMERCE
PATENT OFFICE
Washington, D.C. 20231

UNITED STATES PATENT OFFICE

CERTIFICATE OF CORRECTION

Patent No. 3,439,344

April 15, 1969

Dennis C. Stanga

It is certified that error appears in the above identified patent and that said Letters Patent are hereby corrected as shown below:

Column 12, line 41, after "parity-signal" insert -- reading --. Column 14, line 9, "signals" should read -- signal --.

Signed and sealed this 7th day of April 1970.

(SEAL)
Attest:

Edward M. Fletcher, Jr.
Attesting Officer

WILLIAM E. SCHUYLER, JR.
Commissioner of Patents